United States Patent [19]

Wismer et al.

[11] 3,928,156

[45] Dec. 23, 1975

[54] PROCESS FOR THE ELECTRODEPOSITION OF ZWITTERION-CONTAINING COMPOSITIONS

[75] Inventors: Marco Wismer, Gibsonia; Joseph F. Bosso, Lower Burrell, both of Pa.

[73] Assignee: PPG Industries, Inc., Pittsburgh, Pa.

[22] Filed: July 29, 1971

[21] Appl. No.: 167,476

Related U.S. Application Data

[63] Continuation-in-part of Ser. No. 840,848, July 10, 1969, abandoned.

[52] U.S. Cl. ............................................... 204/181
[51] Int. Cl.² ........................................ C25D 13/06
[58] Field of Search .................................... 204/181

[56] References Cited
UNITED STATES PATENTS

| | | | |
|---|---|---|---|
| 3,582,511 | 6/1971 | Jalics | 204/181 |
| 3,617,458 | 11/1971 | Brockman | 204/181 |
| 3,640,926 | 2/1972 | Slater et al. | 204/181 |
| 3,663,389 | 5/1972 | Koral et al. | 204/181 |

*Primary Examiner*—Howard S. Williams
*Attorney, Agent, or Firm*—Carl T. Severini

[57] ABSTRACT

Synthetic resins which are water-dispersible Zwitterion-containing resins and containing chemically-bound quaternary ammonium base groups can be dissolved or dispersed in water to provide aqueous coating compositions. Such compositions in which these resins are the major resinous component can be applied by electrodeposition and deposit on the cathode to provide coatings of improved properties including a high degree of resistance to corrosion or staining.

4 Claims, No Drawings

PROCESS FOR THE ELECTRODEPOSITION OF ZWITTERION-CONTAINING COMPOSITIONS

CROSS-REFERENCES TO RELATED APPLICATIONS

This application is a continuation-in-part of copending U.S. application Ser. No. 840,848, filed July 10, 1969, now abandoned.

BACKGROUND OF THE INVENTION

Electrodeposition, although known for some time, has only recently become of commercial importance as a coating application method. Along with the increased use of such methods has been the development of certain compositions which can provide satisfactory coating when applied in this manner. while many compositions can be electrodeposited, most coating compositions when applied using electrodeposition techniques do not produce commercially usable coatings. Moreover, electrodeposition of may coating materials, even when otherwise successful, is attended by various disadvantages such as non-uniform coatings and by poor throwing power. In addition, the coatings obtained are in most instances deficient in certain porperties essential for their utilization in many applications for which electrodeposition is otherwise suited. In particular, properties such as corrosion resistance and alkali resistance are difficult to achieve with the resins conventionally employed in electrodeposition processes. This is especeally true with the conventional electrodeposition vehicles, which contain polycarboxylic acid resins solubilized with a base; these deposit on the anode and because of their acidic nature tend to be sensitive to common types of corrosive attack, e.g., by salt, alkali, etc. Many electrodeposited anodic coating are subject to discoloration or staining because of dissolution of metal ions at the anode.

Cationic resins have been developed which are the mose useful resins for many purposes and have excellent corrosion resistance and other properties, for example, those disclosed in copending applications Ser. Nos. 772,353, filed Oct. 31, 1968, now U.S. Pat. No. 3,619,398, and 100,834, filed Dec. 22, 1970.

However, both anionic and cationic resins utilized by the art in electrodeposition are solubilized with a counter-ion, that is, a polyacid resin to solubilize with a base and likewise the polybasic resins are solubilized with an acid. During the electrodeposition, when the resin is coated, the counter-ion is dissociated and becomes free in the bath. The control of this counter-ion which ultimately affects bath and coating properties when it accumulates, has presented a serious and costly problem to the industry.

It has now been found that cationic resins containing a Zwitterion, which are internally solubilized, need no additonal counter-ions and thus eliminate a major control problem in the electrodeposition system.

SUMMARY OF THE INVENTION

It has now been found that synthetic resins which are water-dispersible resins containing Zwitterions wherein the basic portion of the Zwitterions is attributed by chemically-bound quaternary ammonium base groups and the acid portion of the Zwitterion has a dissociation constant of about $1 \times 10^{-5}$, can be easily utilized to provide colloidal water solutions. "Chemically-bound", as utilized herein, includes salts as well as covalent bonding. These compositions can be applied by electrodeposition to provide adherent coating having excellent properties. When electrodeposited, they typically deposit on the cathode; however, depending on the isoelectric point of the Zwitterion, they can be made to deposit on the anode. When employed in aqueous compositions for electrodeposition, the above resins form the major resinous constituent of the composition, either as the sole resinous component or along with one other resinous or film-forming material. Among the properties of the coatings herein are the desirable properties ordinarily associated with electrodepositable resins known heretofore. In addition, these resins provide coatings of unique advantages and properties. These include a high level of resistance to salt spray, alkali and similar corrosive elements, even over unprimed metals and in the absence of corrosion-inhibiting pigment, and are resistant to staining and discoloration often encountered from electrodeposited coatings based on anionic-type resins. Further, these resins in electrodeposition require no added counter-ion and, thus, eliminate a major problem in bath control of an electrodepositable system.

DETAILED DESCRIPTION OF THE INVENTION

The resins of the invention are water-dispersible resins containing in their molecule sufficient quaternary ammonium base group containing Zwitterions to render the molecule water dispersible, the quaternary ammonium base groups beinng chemically-bound to the resin molecule. Further, the acid group which combines whith the quaternary ammonium base group preferably has a dissociation constant greater than $1 \times 10^{-5}$.

In the preferred embodiment, the Zwitterion is contributed by an amino carboxylic acid which is reacted with a base resin in a manner that the amino groups are chemically bound to the resin molecule forming a quaternary ammonium group. The close proximity of the carboxylic acid group to the base group allows the formation of a Zwitterion which in aqueous medum appears as a salt, causing solubilization of the resin in the aqueous medium without the aid of added neutralizing acids.

Alternative metods of incorporating the quaternary ammonium Zwitterion into the resin molecule will produce useful resins within the scope of the invention.

The presently preferred method of incorporating the quaternary ammonium-base Zwitterion is by reaction of a resin molecule containing one or more 1,2-epoxy groups with an amino-carboxylic acid, preferably an amino acid containing a tertiary amine group.

The reacting resin may be virtually any resin containing or reacted to contain at least one 1,2-epoxy group. The resin, may be, for example, among the general classes commonly referred to as polyethers, polyesters, epoxy, acrylic, urethane, fatty acid esters, and the like, while the resin is initially devoid of epoxy groups but contains reactive sites. It may be epoxidized or reacted with a glycidyl compound etc., to provide 1,2-epoxy groups in the resin molecule.

A class of resin which may be utilized may be a polyepoxide or a polyepoxide that has been partially reacted so that only one epoxide group remains. The polyepoxide can be any of the well-known epoxides, for example. Examples of these polyepoxides have, for example, been described in U.S. Pat. Nos. 2,467,171; 2,615,007; 2,716,123; 3,030,336; 3,053,855 and 3,075,999. A useful class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)-2,2-propane, 4,4'-dihydroxybenzophenone, bis(4-hydroxyphenyl)1,1-ethane, bis(4-hydroxyphenyl)1,1-isobutane; bis(4-hydroxytertiarybutyl phenyl)2,2-propane, bis(2-hydroxynaphthyl)methane, 1,5-dihydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethyene glycol, 1,2-propylene glycol, 1,4-butylene glycol, 1,5-pentanediol, 1,2,6-hexanetriol, glycerol, bis(4-hydroxycyclohexyl)2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art. These polyepoxides include epoxidized butadiene-containing resins such as the liquid butadiene derived resins which are ethers of commerce. Another epoxy resin can be obtained by epoxidation of polyesters prepared from unsaturated carboxylic acids such as tetrahydrophthalic anhydride or acid.

Another class of polyepoxides are those containing oxyalkylene groups in the epoxy molecule. Such oxyalkylene groups are typically groups of the general formula:

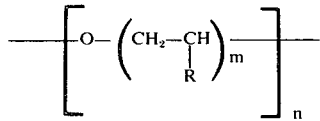

where R is hydrogen or alkyl, preferably lower alkyl (e.g., having 1 to 6 carbon atoms) and where, in most instances, $m$ is 1 to 4 and $n$ to 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about 1 percent by weight or more, and preferably 5 percent or more, of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are expecially useful alkylene oxides. Other monohydric alcohols can be, for example, the commercially-available materials known as Cellosolves adn Carbitols, which are monoalkyl ethers of polyalkylene glycols. The reaction of the monohydric alcohol and the polyepoxide is generally carried out in the presence of a catalyst; formic acid, dimethylethanolamine, diethylethanolamine, N,N-dimethylbenzylamine and in some cases, stannous chloride are useful for this purpose. Similar polyepoxides containing oxyalkylene groups can be produced by oxyalkylating the epoxy resin by other means, such as by direct reaction with an alkylene oxide.

The polyepoxide empoyed to produce the foregoing epoxies containing oxyalkylene groups should contain a sufficient number of epoxy groups so that the average number of residual epoxy groups per molecule remaining in the product after the oxyalkylation is greater than 1.0. Where oxyalkylene groups are present, the epoxy resin preferably contains from about 1.0 to about 90 percent or more by weight of oxyalkylene groups.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat No. 3,391,097; bis-imide containing diepoxides, U.S. Pat. No. 3,450,711; epoxylated aminomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Another class of resins which may be employed are acrylic polymers containing epoxy groups. Preferably these acrylic polymers are polymers formed by copolymerizing an unsaturated epoxy-containing monomer, such as, for example, glycidyl acrylate or methacrylate.

Any polymerizable monomeric compound containing at least one $CH_2=C<$ group, preferably in terminal position, may be polymerized with the unsaturated glycidyl compounds. Examples of such monomers include:

1. Monoolefinic and diolefinic hydrocarbons, that is, monomers containing only atoms of hydrogen and carbon, such as styrene, alpha-methyl styrene, alpha-ethyl styrene, isobutylene (2-methyl propene-1), 2-methyl-butene-1, 2-methy-pentene-1, 2,3-dimethyl-butene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene, butadiene-1,3, isoprene, and the like;

2. Halogenated monoolefinic and diolefinic hydrocarbons, that is, monomers containing carbon, hydrogen, and one or more halogen atoms, such as alpha-chlorostyrene, alphabromostyrene, 2,5-dichlorostyrene, 2,5-dibromostyrene, 3,4-dichlorostyrene, 3,4-difluorostyrene, ortho-, meta- and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chlorode), bromoethylene, fluoroethylene, iodoethylene, 1,1-debromoethylene, 1,1-fluoroethylene, 1,1-diiodoethylene, 1,1,2,2-tetrafluoroethylene, 1,1,2,2-tetrachloroethylene, 1-chloro-2,2,2-trifluoroethylene, chlorobutadiene and other halogenated diolefinic compounds;

3. Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl m-chlorobenzoate and similar vinyl halobenzoates, vinyl p-methoxybenzoate, vinyl o-methoxybenzoate, vinyl p-ethoxy benzoate methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonaate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl-3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethyl-propyl)-1-butene-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

4. Organic nitriles, such as acrylonitrile, methacrylonitrile, ethacrylonitrile, 3-octenenitrile, crotonitrile, oleonitrile, and the like;

In carrying out the polymerization reaction, a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide cumene hydroperoxide, t-butyl hydroperoxide, methyl amyl ketone peroxide, t-butyl hydroperoxide, methyl amyl ketone peroxide, acetyl peroxide, lauroyl peroxide, benzoyl peroxide, methyl cyclohexyl hydroperoxide, p-chlorobenzyl peroxide, di-t-butyl peroxide, peracetic acid, t-butyl mermaleic acid, di-ti-butyl diperphthalate, t-butyl perphthalic acid t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl)ether and alpha, alpha-azobisisobutyronitrile may also be used as polymerization catalysts in the preparation of the interpolymers. Redox catalyst systems can also be employed.

The quality of the catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferalby employed. For low viscosity interpolymers the bulk of the catalyst is added initially and later additions used only to secure desired conversions. Larger amounts of catalyst added initially give lower viscosities.

The acrylic polymer may likewise be prepared with monomers of the type such that the final polymer contains potential crosslinking sites. Such monomers include acrylamides or methacrylamides, their N-methylol or N-methylol ether derivatives; unsaturated monomers containing capped isocyanate groups, or aziridyl groups; and hydroxy-containing unsaturated monomers, for example, hydroxyalkyl acrylates.

Another method of producing acrylic polymers which may be utilized in this invention is to react an acrylic polymer containing reactive sites, such as carboxyl groups or hydroxyl groups, secondary amine groups or other active hydrogen-containing sites, with an epoxy-containing compound such as the diglycidyl ether of Bisphenol A or other polyepoxides as enumerated elsewhere herein, to provide an epoxy group-containing acrylic polymer.

Vinyl addition polymers which contain alicyclic unsaturation can be epoxidized to form an epoxy group-containing polymer.

Yet another class of polymers which are useful in preparing the resins of this invention are isocyanate group containing polyurethanes. The isocyanate-terminated polyurethane prepolymers (I) employed as starting materials according to the present invention may be obtained by the reaction of a selected polymeric glycol. The polyurethane polymers include those which are prepared from polyalkylene ether glycols and diisocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$ in which R stands for an alkylene radical and $n$ is an integer. Glycols containing a mixture of radicals, as in the compound $HO(CH_2OC_2H_4O)_nH$, or $HO(C_2H_4O)_n(C_3H_6O)_m(C_2H_4O)_nH$, can be used. These glycols are either viscous liquids or waxy solids. Polytetramethylene ether glycols, also known as polybutylene ether glycols, may be employed. Polyethylene ether polypropylene ether glycols, having the above-indicated formula, are amoung the preferred glycols. Polyethylene ether glycols, poly-1,2-propylene ether glycols, polydecamethylene ether glycols, and poly-1,2-dimethyl ethyl ether glycols are representative of other operative compounds. The presently preferred glycols are polypropylene glycols with a molecular weight between about 300 and about 1000.

Any of a wide variety of organic polyisocyanates (b) may be employed in the reaction, including aromatic, aliphatic, and cycloaliphatic diisocyanates and combinations of these types. Representative compounds include aromatic diisocyanates, such as 2,4-tolylene diisocyanate, mixtures thereof with 2,6-tolylene diisocyanates (usually about 80/20), 4,4-methylene-bis(-phenylisocyanate), and m-phenylene diisocyanate. Aliphatic compounds such as ethylene diisocyanate, ethylene diisocyanate, propylene-1,2-diisocyanate, butylene-1,3-diisocyanate, tetramethylene diisocyanate, hexamethylene diisocyanate and decamethylene diisocyanate and alicyclic compounds such as 1,2- and 1,4-cyclohexylene diisocyanates, 4,4'-methylene-bis(cyclohexylisocyanate) and isophorone diisocyanate are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds the isocyanate groups may be attached either to the same or to different rings. Additional polyisocyanates which may be employed, for example, include: p,p'-diphenylmethane diisocyanate, 3,3'-dimethyl-4,4'-biphenylene diisocyanate, 3,3'-dimethoxyoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with alpha, alpha'-dibromo-p-xylene in the presence of alkali. In such rpducts, the cyclic groups inserted in the polyether chain are preferably phenylene, naphthylene or cyclohexylene radicals or those radicals containing alkyl or alkylene substitutents, as in the tolylene, phenylethylene or xylene radicals.

Also included in the polyurethane products are those made from a substantially linear polyester and an organic diisocyanate of the previously described. Products of this sort are described in U.S. Pat. Nos. 2,621,166, 2,625,531 and 2,625,532. The polyesters are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, and dicarboxylic acids such as malonic, maleic, succinic, adipic, pimelic, sebacic, oxalic, phthalic, terephthalic, hexahydroterephthalic, and para-phenylene-diacetic acids, decamethylene decarboxylic acid, and the like. Another useful group of compounds for this purpose are the polyester amide resins having terminal hydroxyl groups. The preferred polyesters may be represent by the formula $HO—B—OOC—C'—COO_nBOH$ in which B and B' are hydrocarbon radicals derived from the glycol and dicarboxylic acid respectively and $n$ is an integer. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate to give isocyanate-terminated polyurethanes for use as starting materials in the present invention. The starting polyurethane glycol is prepared by reacting a molar excess of a polymeric glycol, such as a polyalkylene ether glycol, with an organic diisocyanate. The resulting polymer is a polyurethane containing terminal hydroxyl groups which may then be further reacted with additional polyisocyanate to produce the strating isocyanate-terminated polyurethane prepolymer.

Another starting polyurethane prepolymer may be such as disclosed in U.S. Pat. No. 2,861,981, namely, those prepared from a polyisocyanate and the reaction product of an ester of an organic carboxylic acid with an excess of a saturated aliphatic glycol having only carbon atoms in its chain and a total of 8 to 14 carbon atoms, at least one two-carbon atom branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula:

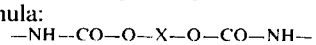

wherein the bivalent radical —O—X—O— is obtained by removing the terminal hydrogen atoms of the polymeric glycol, said glycol being selected from the group consisting of polyalkylene ether glycols, polyurethane glycols, polyalkylenearylene ether glycols, polyalkylene-cycloalkylene ether glycols, polyalkylene ether-polythioether glycols, polyester amide glycols and polyester glycols of the formula:

HO—[B—O—CO—B'—CO—O]$_n$—B—OH where B and B' are hydrocarbon radicals and $n$ is an integer, and that a typical isocyanate-terminated polyurethane polymer produced from diisocyanates and dihydric glycols will, on an average, contain, at a 2:1 NCO:OH ratio, a plurality of intralinear molecules conforming to the formula:

OCN—Y—NH—CO—O—X—O—CO—NH—Y—NCO wherein —O—X—O— has the value given previously and Y is the polyisocyanate hydrocarbon radical.

POLYURETHANE PREPOLYMER PREPARATION

In the preparation of the starting polyurethane polymer, an excess of the organic polyisocyanate of the polymeric glycol is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the glycol will be at least one to one and may be up to a 3 to 1 equivalent ratio. The glycol and the isocyanate are ordinarily reacted by heating with agitation at a temperature of 50°C. to 130°C., preferably 70°–120°C. The ratio of organic polyisocyanate compound to polymeric glycol is usually and preferably between about 1.3:1 and 2.0:1.

The reaction is preferably, but not necessarily, effected in the absence of a solvent, when the prepolymer is a fluid at processing temperatures, when it is not, or when it is desired to employ a solvent, convenient solvents are inert organic solvents having a boiling range above about 90°C. when the reaction is to be carried out in open equipment. Lower boiling solvents may of course be used where the reaction is carried out in closed equipment to prevent boiling off the solvent at the temperatures of the reaction. Solvents boiling at substantially more than 140°C. are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended product is insoluble. Ketones, tertiary alcohols and esters may be used. The aliphatic hydrocarbon solvents such as the heptanes, octanes and nonanes, or mixtures of such hydrocarbons obtained from naturally-occurring petroleum sources such as kerosene, or from synthetically prepared hydrocarbons, may sometimes be employed. Cycloaliphatic hydrocarbons ssuch as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution, if an emulsion technique is to be employed in the chain extension; sometimes the excess solvent is useful and is allowed to remain during the emulsification stage.

The reactants are cooked for a period sufficient to react most, if not all, of the hydroxy groups, whereafter the prepolymer is allowed to stand and the free NCO content determined. Usual pHs are employed during preparation of the prepolymer, the reaction preferably being maintained substantially neutral. Bases accelerate the reaction, acids retard the reaction, and preferably neither are added.

These isocyanate group-containing polyurethanes are then reacted with an epoxy containing compound such as glycidol, for example, at temperatures of about 25°C. to about 45°C., usually in the presence of a catalyst which promotes urethane formation.

The quaternary ammonium base group, Zwitterion-containing resins can be prepared by reacting virtually any epoxy group containing resin, for example, vinyl addition polymers, polyethers, polyesters, polyurethanes, polyamides, polycarbonates, including polymers having reactive sites for crosslinking, for example, hydroxylcarboxyl amides, N-methy amides, capped isocyanates, and others, with an amino acid, such as amino carboxylic acids. The amino carboxylic acid may be virtually any amine-containing one or more secondary or tertiary amino groups and at least one terminal carboxyl group. In most cases where a carboxylamine is employed, it corresponds to the general formula:

$$\begin{matrix} R_1 \\ R_2 \end{matrix} \! \! \! \! \! \! \! \! \! \! \! \! \! \! \! \! \! \! \! > NR_3COOH$$

where $R_1$ and $R_2$ are each preferably methyl, ethyl, or other lower alkyl groups, but can be essentially any other organic radical, so long as they do not interfere with the desired reaction. Benzyl, alkoxyalkyl, and the like are examples. $R_1$ can also be hydrogen. The nature of the particular groups is less important than the presence of a secondary or tertiary amino nitrogen atom, and thus higher alkyl, aryl, alkaryl, aralkyl, and substituted groups of these types can be present. The group represented by $R_3$ is a divalent organic group, such as alkylene or substituted alkylene, e.g., oxyalkylene or poly(oxyalkylene), or, less desirably, arylene, alkarylene or substituted arylene. $R_3$ can also be an unsaturated group, e.g., an alkylene group.

Such amines can be prepared by known methods. For example, an acid anhydride, such as succinic anhydride, phthalic anhydride or maleic anhydride, an be reacted with an alkanol-amine, such as dimethylethanolamine or methyldiethanolamine; the group represented by $R_3$ in the amines produced in such cases contain ester groups. Other types of amines are provided, for example, by reacting an alkylamine with an alkyl acrylate or methacrylate such as methyl or ethyl acrylate or methacrylate, as described in U.S. Pat. No. 3,419,525. The ester group is subsequently hydrolyzed to form a free carboxyl group. Other methods for producing amines of different types can also be employed.

It can be seen that the groups represented by $R_3$ can be of widely varying types; some examples are:

— R'
— R'OCOR' —

—(R'O)$_n$COR'—where each R' is alkylene such as —CH$_2$CH$_2$—,

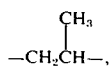

etc., or alkenylene, such as —CH=CH—, and $n$ is 2 to 10 or higher. Other groups represented by R' include cyclic or aromatic groups.

The amino acid and the epoxy compound are reacted by mixing the components, usually at moderately elevated temperatures, such as 70°–100°C. A solvent is not necessary, although one is often used in order to afford better control of the reaction. Aromatic hydrocarbons or monoalkyl ethers of ethylene glycol are suitable solvents. The proportion of the amino acid and the epoxy compound can be varied and the optimum proportions depend upon the particular reactants. Ordinarily, however, from about one part to about 50 parts by weight of the amino acid per 100 parts of the epoxy-containing base resin are employed. The proportions are usually chosen with reference to the amount of nitrogen contributed by the amino acid, which is typically from about 0.05 to about 16 percent, based on the total weight of the amino acid and the epoxy containing base resin. Since the amino acid reacts with the epoxy groups of the epoxy group-containing base resin in order to provide epoxy group free resin, preferably a stoichiometric amount of amino acid is employed with relationship to the stoichiometric equivalents of the epoxy groups present, so that the final resin is devoid of epoxy groups. Alternatively, where not all the epoxy groups are reacted, epoxy groups may be further reacted or hydrolyzed by conditions known in the art.

In addition to the amino acid, there may be similarly reacted into the polymers of the invention an amine salt to provide additional quaternary ammonium base salt groups which may assist in rendering the polymer water-dispersible.

Examples of salts which may be employed include salts of ammonia, primary, secondary or tertiary amines, and preferably tertiary amines; which are salts of an acid, preferably in organic acid having a dissociation constant greater than $1 \times 10^{-5}$. The presently preferred acid is lactic acid. Such acids include lactic acid, acetic acid, propionic acid, butyric acid, hydrochloric acid, phosphoric acid, and sulfuric acid. The amines may be unsubstituted amines or amines substituted with non-reactive constituents such as halogens or hydroxylamines. Specific amines include dimethylamine salts of lactic, propionic, butyric, hydrochloric, phosphoric and sulfuric or similar salts of triethylamine, diethylethanolamine, trimethylamine, diethylamine, dipropylamine, 1-amino-2-propanol, and the like. Also included are ammonium lactate, ammonium acetate, ammonium chloride, ammonium phosphate, as well as other amine and ammonium salts as defined above.

The particular reactants, proportions and reaction conditions in each stage may be chosen in accordance with considerations well known in the art so as to avoid gelation of the product during the reaction. For example, excessively severe reaction conditions should not be employed. Similarly, compounds having reactive substituents should not be utilized along with epoxy-containing base resins with which those substituents react adversely at the desired conditions.

The product forming the resin of the invention may be crosslinked to some extent; however, it remains soluble in various organic solvents and is water-dispersible. It is significantly characterized by its chemically-bound quaternary ammonium base groups and its Zwitterion content.

Aqueous composition containing the above reaction products are highly useful as coating compositions and may be applied by any conventional method such as by dipping, brushing, etc. They are, however, eminently suited to application by electrodeposition.

The resin of the invention is water-dispersible and electrodepositable without the aid of added solubilizing agents, although an acid or acidic solubilizing agent may be added if desired to modifiy bath or deposition properties.

Where an acid or acidic solubilizing agent is added, it may be any acid having a dissociation constant greater than $1 \times 10^{-5}$, preferably the acid or acidic solubilizing agent should be an organic acid having a dissociation constant greater than about $1 \times 10^{-5}$, the presently preferred acid being lactic acid.

As previously stated, the resins of the invention are derived from an amino carboxylic acid and contain a Zwitterion or internal salt, that is, an interaction between the quaternary group formed and the carboxyl group present, the carboxyl group displaying a dissocation constant greater than $1 \times 10^{-5}$. The resultant resin is inherently self-solubilized or dispersed without the use of external solubilizing agents.

Preferably the resin of the invention contains about 0.05 to about 16 percent by weight nitrogen contributed by the amino acid. At least about 1 percent of said nitrogen and preferably about 20 percent or more, and more preferably 50 percent, and most preferably, substantially all of the nitrogen being in the form of chemically-bound quaternary ammonium base groups.

The concentration of the product in water depends upon the process parameters to be used and is, in general, not critical, but ordinarily the major proportion of the aqueous composition is water, e.g., the composition may contain from 1 to 25 percent by weight of the resin.

Preferably, the electrodepositable compositions of the invention contain a coupling solvent. The use of a coupling solvent provides for improved deposited film appearance. These solvents include hydrocarbons, alcohols, esters, ethers, and ketones. the preferred coupling solvents include monoalcohols, glycols, and polyols as well as ketones and ether alcohols. Specific coupling solvents include isopropanol, butanol, isophorone, Pentoxane (4-methoxy-4-methyl pentanone-2), ethylene and propylene glycol, the monomethyl, monoethyl and monobutyl ethers of ethylene glycol, 2-ethylhexanol, and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 and about 25 percent by weight of the dispersant is employed.

While the resins hereinabove described may be electrodeposited as substantially the sole resinous component of the electrodeposited composition, it is frequently desirable in order to improve or modify film appearance and/or film properties, to incorporate into the electrodepositable compositions various non-reactive and reactive compounds or resinous materials such as plasticizing material including N-cyclohexyl-p-toluene sulfonamide, ortho- and para-toluene sulfonamide, N-ethyl-ortho-and para-toluene sulfonamide, aromatic and aliphatic polyether polyols, phenol resins, including allyl ether containing phenolic resins, liquid epoxy resins, quadrols, polycaprolactones; triazine resins such as melamine-based resins and benzoguanamine-based resins, especially alkylated formaldehyde reaction products thereof; urea formaldehyde resins, acrylic resins, hydroxyl and/or carboxyl group-containing polyesters and hydrocarbon resins.

Other materials include esters such as butylbenzyl phthalate, dioctyl phthalate, methyl phthalylethyl glycolate, butylphthalylbutyl glycolate, cresyl diphenyl phosphate, 2-ethylhexyl diphenyl phosphate, polyethylene glycol 200 dibenzoates as well as polyesters, 2,2,4-trimethyl pentanediol monoisobutyrate (Texanol).

In most instances, a pigment composition and, if desired, various additives such as anti-oxidants, surfactants, or wetting agents, for example, Foam Kill 639 (a hydrocarbon oil-containing inert diatomaceous earth), as well as glycolated acetylines (the Surfynats, for example), sulfonates, sulfated fatty amides, and alkyl-phenoxypolyoxyalkylene alkanols, and the like, are included. The pigment composition may be of any conventional type, comprising, for example, iron oxides, lead oxides, strontium chromate, carbon black, titanium dioxide, talc, barium sulfate, as well as color pigments such as cadium yellow, cadium red, chromic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general, similar to those used in electrodeposition of other types of coatings. The applied voltage may be varied greatly and can be, for example, as low as 1 volt or as high as several thousand volts, although typically between 50 and 500 volts. The current density is usually between about 1.0 amperes and 15 amperes per square foot, and tends to decrease during electrodeposition.

In the typical aqueous electrodeposition of a solubilized resin, upon deposition there is formed a counter-ion which tends to migrate towards the counter-electrode. It is the unique property of the resins of this invention that since they are solutilized by internal salt formation, no substantial counter-ions are generated and therefore the need of controlling these counter-ions through solubilizing agent deficient feed, membrane control, ion exchange or other means is unnecessary or at least greatly reduced.

The method of the invention is applicable to the coating of any conductive substrate, and especially metals such as steel, aluminum, copper, magnesium, or the like. After deposition, the coating is cured, usually by baking at elevated temperatures. Temperatures of 250°–500°F. for one to 30 minutes are typical baking schedules utilized.

As set forth above, the significant resin constituents are (A) quaternary ammonium groups; and (B) internal Zwitterions.

The total base groups present in the polymer, that is, quarternary and amine groups present, may be determined on a separate resin example. Usually the resin sample will be neutral. If, however, the resin is basic, the sample should be neutralized with a known amount of the acid present in the resin as a salt. Where the acid present in the resin as a salt is a weak acid as compared to HCl, the resin is titrated with HCl and back-titrated with sodium hydroxide on an automatic titrator. The HCl titration yields the total base groups present. The sodium hydroxide back-titration distinguishes quarternary groups from amine groups. For example, a typical analysis is conducted as follows: a 10 milliliter sample of an about 10 percent solid electrodeposition bath is pipetted in 60 milliliters of tetrahydrofuran. The sample is titrated with 0.1000 normal HCl to the pH endpoint. The amount of standard acid used is equivalent to the quarternary base and amine equivalents present. The sample is then back-titrated with 0.1000 normal sodium hydroxide to give a titration curve with multiple endpoints. In a typical instance, the first endpoint corresponds to excess HCl. From the HCl titration, the second endpoint corresponds to the neutralization of the weak acid (for example, lactic acid) and amine hydrochloride. The difference in volume between the two endpoints gives the volume of standard base equivalent to the weak acid and amine content of the sample.

Excess weak acid or amine salt in the electrodeposition bath may be determined by alcoholic-KOH titration. For example, a 10 milliliter sample of about 10 percent solids electrodeposition bath is pipetted into 60 milliliters of tetrahydrofuran and potentiometrically titrated with 0.1000 normal alcoholic KOH to the first endpoint. The amount of KOH consumed is equivalent to any acid or amine salt in the sample. In the case of neutral compositions, KOH titration is a measure of the amount of amine present in the form of amine salt since the quarternary, being a strong base, will not titrate.

The presence of Zwitterions can be determined by passing a solution of the resin (for example, ⅓ propylene glycol, ⅔ tetrahydrofuran) through a strong base ion exchange resin in the hydroxyl form. The Zwitterion passes unchanged through the column, whereas if a free quaternary salt is present in the resin, the quaternary hydroxide is formed. By titration, the amount and strength of the base in the exchange resin may be determined.

The above description is exemplary of the technique employed to quantitatively and qualitatively identify the groups present. In specific case, analytical techniques may be adapted to a specific resin; however, in each case, consistent with the above description, there exists methods known in the art which yield appropriate accurate determinations of the significant chemical moiety content.

Illustrating the invention are the following examples, which, however, are not to be construed as limiting the invention to their details. All parts and percentages in the examples, as well as throughout this specification, are by weight unless otherwise specified.

EXAMPLE I

A copolymer was prepared by copolymerizing 15 parts of glycidyl methacrylate, 25 parts of N-vinyl-2-pyrolidone, 15 parts of hydroxyethyl acrylate and 45 parts of n-butyl acrylate. The above monomers were mixed with 2 parts of alpha, alpha-azobisisobutyronitrile until a clear solution resulted. To a quarter of this mixture was then added to 34 parts of isopropyl alcohol at reflux. After 30 minutes, the remaining monomer-initiator solution was added at a constant rate over a 3-½ hour period maintaining reflux. At the end of the addition, 2 parts of 2,6-di-tert-butyl-p-cresol was added. The resultant resin solution contained 75 percent solids and had an epoxy value of 1286.

To 100 parts of the above resin solution at 90°C. there was then added 9.2 parts of β-N,N-dimethylaminopropionic acid (a stoichiometric amount) with relation to the epoxy content of the above resin. The β-N,N-dimethylaminopropionic acid was added as a solution in 16 parts of 50/50 water/isopropanol over a period of five minutes with vigorous stirring. The reaction mixture was then held for 15 minutes at 88°–90°C., after which time deionized water was added slowly at intervals until the solids content was lowered to about 60 percent solids. After about 45 minutes the resin was totally dispersible in water.

A 10 percent aqueous electrodeposition bath was prepared by diluting the above resin by slow addition of deionized water with stirring. The resultant bluish-white opalescent dispersion had a pH of 5.7–6.0 and a conductivity of 460 micromhos.

Aluminum panels as the cathode were electrocoated at 75°F. at 200 volts. The wet films were smooth, adherent and continuous. The coatings were baked at 350°F. for 20 minutes to yield somewhat rough but hard films.

The polymer apparently contained the following groups:

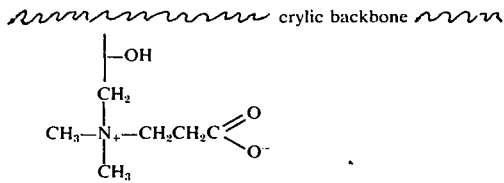

EXAMPLE II 250 parts of a 40 percent solution of Epon 871 in isopropanol was heated to 75°C. 37 parts of beta-N,N-dimethylaminopropionic acid was added as a 65 percent solution in water and the resultant mixture was heated at 75°–80°C. for 3 hours, so that all the epoxy functionality was comsumed. The resultant reaction mixture was diluted to 20 percent solids with deionized water at 75°C. Upon cooling to room temperature, the solution was further diluted to 7 percent solids and allowed to stir overnight in an open container to evaporate a portion of the isopropanol. The dispersion remained stable (bluish white opalescence) the next day.

Aluminum panels, as the cathode, were electrocoated at 100–200 volts for 1 minute at 75°F. The wet films were quite uniform and had excellent adhesion. The films were baked at 350°F. for 30 minutes to yield smooth coatings.

EXAMPLE III

A urethane prepolymer was prepared by reacting 100 parts of poly(propylene oxide)glycol (molecular weight 1025) with 34 parts of toluene diisocyanate (a molar ratio of 1:2). The glycol was added to the diisocyanate at a rate which maintained the reaction temperature at 50°C. After addition was complete, the resin was heated at 80°C. for 90 minutes. The reaction product had no NCO value of 700 grams of product/mole NCO, indicating a molecular weight of about 1400. 100 parts of the propolymer was then mixed with 10.6 parts of glycidol and allowed to stand for 24 hours at room temperature. There was then added ½ percent of dibutyl tin dilaurate as a catalyst and the mixture stirred for 2 hours at 45°C. All of the NCO groups were consumed. Epoxy value 789, 99.5 percent solids.

200 parts of the reaction product were then heated to 40°C. with a stoichiometric amount based on epoxide (31 parts) of beta-N,N-dimethylaminopropionic acid in the presence of sufficient isopropanol (e.g., 50–90 parts) to give a clear solution. The reaction temperature was increased to 85°C. for 15 minutes. There was then added sufficient deionized water to give a slightly cloudy solution. Heating was continued for 45 minutes, whereupon the resin solution was totally dispersible in water to give a slightly turbid dispersion, pH 7.7, conductivity 813 micromhos. Films were electrodeposited on an aluminum cathode as above.

Various other epoxy group containing resins and amino acids and conditions such as those hereinabove described may be substituted for those of the Examples to achieve results within the scope of the invention.

According to the provisions of the Patent Statutes, there are described above the invention and what are now considered to be its best embodiments. However, within the scope of the appended claims, it is to be understood that the invention can be practiced otherwise than as specifically described.

We claim:

1. A method of electrodepositing a resin upon a conductive substrate serving as an electrode in an electric circuit, which method comprises passing an electric current between said electrode and a counter-electrode in electrical contact with an aqueous electrodepositable composition comprising an aqueous dispersion of an ungelled, inherently water-dispersible epoxy group free electrodepositable resin containing Zwitterions, said Zwitterions consisting of a quaternary ammonium base group and a carboxyl group, thereby electrodepositing an adherent coating upon said electrode.

2. A method as in claim 1 wherein the resin is selected from the group consisting of vinyl addition polymers, polyethers, polyurethanes, polyesters and polyamides.

3. A method as in claim 1 wherein the resin contains between about 0.05 percent and about 16 percent quarternary nitrogen.

4. A method as in claim 1 wherein the Zwitterion is derived from beta-N,N-dimethylaminopropionic acid.

* * * * *